June 9, 1942.            J. L. HARRIS            2,285,513
CONTROL APPARATUS
Filed Dec. 30, 1939
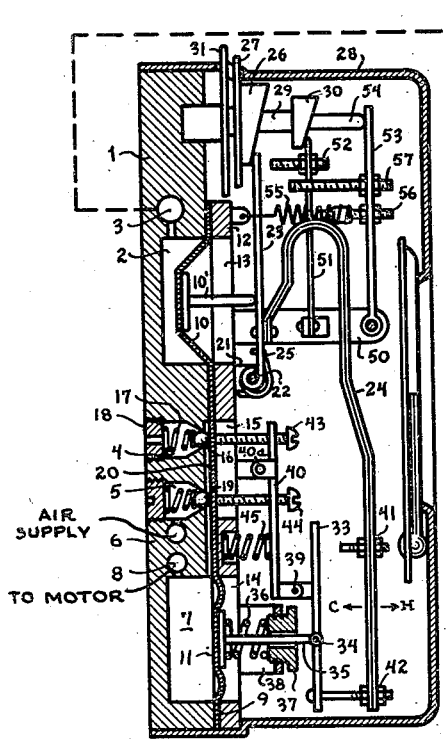
Inventor
John L. Harris
By George H. Fisher
Attorney Patented June 9, 1942

2,285,513

UNITED STATES PATENT OFFICE 2,285,513

CONTROL APPARATUS

John L. Harris, Minneapolis, Minn., assignor to Minneapolis-Honeywell Regulator Company, Minneapolis, Minn., a corporation of Delaware Application December 30, 1939, Serial No. 311,883

9 Claims. (Cl. 236—1)

This invention relates in general to automatic controls and more particularly to pneumatic control systems for controlling heating, ventilating and air conditioning systems for buildings.

In the air conditioning art it has become common to provide for both cooling a building in summer and heating the building in winter, the heating and cooling being performed by the same apparatus. It has also become common to provide individual room or zone control in systems of this type. For example, one well known form of heating and cooling system for a building consists of a central fan system wherein cold or hot air is delivered to the various rooms, the flow of air into each room or zone being controlled by a damper which is positioned by a thermostat responding to the temperature in the room. Another type of system employs unit conditioners in each room or zone, these conditioners being supplied with cooling medium in summer and heating medium in winter, the supply of cooling or heating medium to each conditioner being controlled by a valve under the control of an individual thermostat. For controlling heating and cooling systems of this type, pneumatic control systems are generally employed, special reversing thermostats being provided for providing proper control in summer and in winter, these thermostats being reversed from summer operation to winter operation by changing the pressure in a control line common to all of the thermostats, or by changing the direction of flow of air through the thermostats. In controlling building temperature, it is usually desirable to vary the temperature maintained by the temperature control system at times. For example, during the heating season it is desirable to lower the temperature in the building to a sub normal temperature during periods of non-occupancy in order to conserve fuel. Similarly, during the cooling season it is desirable to allow the temperature to rise during such periods of non-occupancy. Also during the cooling season it is desirable to vary the temperature maintained within the building in accordance with outside temperature in order to maintain the temperature at whatever value is necessary for securing maximum comfort to the occupants.

It is an object of the present invention to provide a pneumatic control instrument and system which permits the action of the instrument to be reversed from a remote point and which additionally permits the control point of the instrument to be varied from a remote point.

A further object of this invention is to provide a pneumatic control instrument in which a single condition responsive element controls a valve device and in which the action of the condition responsive element is reversed by a lever system or linkage between the valve device and element, such lever system or linkage being adjusted for providing direct or reverse action by means of a pressure responsive device controlled from a remote point.

Another object of this invention is the provision of a reversing condition control instrument in which a single pressure responsive device controlled from a remote point both reverses the action of the instrument and varies its control point.

A further object of this invention is the provision of a pneumatic control system in which change in pressure in a single air line both reverses the action of a pneumatic control instrument and varies its control point.

Another object of this invention is the provision of a pneumatic control instrument in which the condition responsive element is movably mounted and shifted in position by a pressure responsive device, change in position of the element reversing the action of the instrument.

For a full disclosure of this invention reference is made to the following detailed description and to the accompanying drawing in which Figure 1 shows a summer-winter thermostat embodying the features of the present invention, this figure also showing diagrammatically one form of control for this thermostat, Figure 2 shows a modified form of summer-winter thermostat, and Figure 3 shows another modification.

Referring to Figure 1 reference character 1 indicates a base or wall plate for the thermostat, this base having formed therein a diaphragm chamber 2 communicating with a pipe connection 3. The base member 1 also includes a vent valve chamber 4 and an inlet valve chamber 5, this chamber 5 communicating with a pipe connection 6 which is adapted for connection to an air supply pipe. The base member 1 also includes a diaphragm chamber 7 communicating with a pipe connection 8 which is adapted for connection to a branch line leading to a pneumatic motor controlled by the thermostat (not shown). Covering the chambers 2, 4, 5 and 7 is a diaphragm 9, this diaphragm including a portion 10 covering chamber 2 and a portion 11 covering chamber 7. The diaphragm 9 is secured in place by a cover plate 12, this cover plate being provided with an opening 13 coinciding with the chamber 2, and opening 14 coinciding with chamber 7, and an opening 15 opposite the valve chambers 4 and 5. Located in the valve chamber 4 is a vent valve 16 preferably formed as a ball, this valve being urged towards closed position by means of a spring 17 secured in place by means of a plug 18, containing a vent opening as shown. The inlet valve chamber 5 contains an inlet valve 19 which is urged against its seat by a spring which is held in place by a plug covering this valve chamber. The valve chambers 4 and 5 communicate with a chamber 20 formed in the base member 1 coinciding with the opening 15 of the cover plate 12. This chamber 20 in turn communicates with the diaphragm chamber 7.

Mounted on the cover plate 12 is a bracket 21 carrying a pivot 22 for a lever 23, this lever having secured thereto a U-shaped bimetallic element 24. A spring 25 is provided adjacent the pivot 22 for urging the lever 23 in the counter-clockwise direction thus tending to cause this lever to engage a cam 26 which is secured to a dial 27 extending through the instrument cover 28. This cam and dial are carried by a shaft 29 which shaft is rotatably secured to the base member 1 and carries a cam 30 and an adjusting dial 31. As will be later described in detail, the dial 31 and cam 30 provide adjustment of the day setting of the instrument, and the cam 26 and dial 27 provide an adjustment for the night setting of the instrument.

The bimetallic element actuates a lever 33 which is pivoted at 34 to a plunger 35 which plunger is actuated by the diaphragm portion 11 which covers the diaphragm chamber 7. This diaphragm portion 11 is biased rearwardly by means of a spring 36, this spring abutting an adjusting screw 37 carried by a bracket 38 mounted upon the cover plate 12. By rotating the adjusting screw 37 the tension of spring 36 may be varied as desired. The lever 33 is also pivoted at 39 to a valve lever 40. This valve lever 40 is pivoted at 40a and carries an adjusting screw 43 which contacts the diaphragm 9 opposite the vent valve member 16 and causes this vent valve member to be urged from its seat upon counter-clockwise rotation of lever 40. Lever 40 also carries an adjusting screw 44 which contacts the diaphragm 9 opposite the inlet valve member 19 and serves to urge this member from its seat upon clockwise rotation of the lever 40. When lever 40 is in the control or neutral position shown, both the supply and vent valves are closed. A spring 45 is provided for urging the valve lever 40 in the counter-clockwise direction, this action being resisted by the lever 33, which lever is actuated by the thermostatic element 24 through either the abutment screw 41 or the abutment screw 42 depending upon whether the instrument is adjusted for summer or winter operation. It will be noted that the abutment screw 41 is adapted to contact the front face of lever 33 at a point above pivots 34 and 39. The abutment screw 42 however is provided with a head which is adapted to engage the rear face of lever 33 at a point below pivots 34 and 39. This abutment screw may either extend around lever 33 or may extend through a slot formed in this lever.

Mounted on the cover plate 12 is a bracket 50 which bracket carries a leaf spring member 51 which member is arranged so as to engage the front face of the day adjustment cam 30. This leaf spring member 51 carries an adjusting screw 52 which is adapted to be engaged by the lever 23 which carries the bimetallic element 24. The bracket 50 also carries a lever 53 which is urged against a stop 54, which may be formed as an extension of shaft 29, by means of a spring 55, an adjusting screw 56 being provided for varying the tension of this spring. The lever 53 also carries an adjusting screw 57 adapted for engagement with the lever 23.

The pipe connection 3 which communicates with the diaphragm chamber 2 is connected to a control line 60 which control line is connected to a three-way summer-winter changeover valve 61. One inlet of this three-way valve 61 is connected by a pipe 62 with a day-night control switch 63 which is in turn connected to an air supply line 64. This day-night control switch may be of any suitable type of manually adjusted pressure regulator and is provided with a handle 65 for causing this device to maintain either 5 lbs. pressure in pipe 62 or zero pressure in this pipe. During the winter the changeover valve 61 is positioned for connecting pipes 62 and 60 for thereby placing the day-night control 65 in control of the pressure applied to diaphragm chamber 2 of the thermostat. During the summer the three-way valve 61 is positioned for disconnecting the day-night control 65 from the control line 60 and connecting this control line to a pipe 66 which leads from a second three-way valve 67. This three-way valve 67 has one inlet connected by pipe 68 directly to the air supply pipe 64 and has its other inlet connnected by a pipe 69 to a master thermostat 70 which is located so as to respond to outside temperature. This master thermostat 70 is connected to the air supply pipe 64 and may be adjusted so as to vary the pressure in pipe 69 from 10 lbs. to 15 lbs. upon rise in outside temperature from 75° to 100°.

With the parts in the positions shown the changeover valve 61 is positioned for placing the thermostat on winter operation, that is, it is positioned for connecting the day-night control 65 to the control line 60 of the thermostat, this control line 60 at this time being disconnected from the three-way valve 67. Also the day-night control 63 is positioned for night operation, or in other words, this control is positioned for completely venting the control line 60 thereby causing the pressure in diaphragm chamber 2 to equal atmospheric pressure. This permits the spring 25 to rotate the lever for causing it to engage the night adjustment cam 26. At this time the bimetallic element 24 is positioned so that the abutment screw 41 engages the lever 33 and the abutment screw 42 is clear of this lever.

If the room temperature should increase, the lower end of the bimetallic element 24 will swing to the right which will through abutment screw 42 cause the lever 33 to rotate counter-clockwise about pivot 34 which will cause the valve lever 40 to rotate clockwise against the action of spring 45, this causing the adjusting screw 44 to urge the supply valve 19 from its seat which permits air under pressure to enter the diaphragm chamber 7 and to flow from this chamber through pipe connection 8 to the pneumatic motor controlled by the thermostat. Assuming that this pneumatic motor is of the direct acting type, the increase in pressure will cause it to decrease the flow of heating medium to the room controlled by the thermostat. As the pressure in diaphragm chamber 7 increases, it will force the diaphragm portion 11 to the right against the action of spring 36 which will cause the lever 33 to rock clockwise about its point of engagement with the head of adjusting screw 42, this causing the valve lever 40 to be returned to its neutral position wherein the supply valve is closed. It will be apparent that the increase in pressure caused by rise in temperature will be proportionate to the rise in temperature. If the room temperature decreases, the lower end of the bimetallic element 24 will swing to the left thus causing clockwise rotation of lever 33 about pivot 34 under the action of spring 45 which permits rocking of valve lever 40 counter-clockwise for urging the vent valve 16 from its seat which permits air to flow from the pneumatic motor being controlled and the diaphragm chamber 7 to atmosphere, thereby reducing the pressure applied to this motor for causing it to increase the amount of heating medium supplied to the room. As the pressure in diaphragm chamber 7 decreases, the spring 36 will urge the diaphragm portion 11 and plunger 35 to the left for thereby rocking lever 33 clockwise about its point of engagement with abutment screw 42, this action causing the valve lever 40 to be urged clockwise against the action of spring 45 for thus returning it to its neutral position wherein both the supply valve and vent valve are closed. From the foregoing description it will be apparent that with the parts in the position shown upon decrease in temperature in the room the pressure applied to the pneumatic motor is decreased proportionately to the decrease in temperature and that upon increase in temperature this pressure is increased proportionately to the temperature increase. By rotating the dial 27 and cam 26, the position of the bimetallic element 24 when the thermostat is on its night setting may be adjusted to whatever night temperature is desired.

When it is desired to cause the thermostat to maintain the desired daytime temperature, the control 65 is positioned to its day setting which will apply 5 lbs. pressure to the diaphragm chamber 2. This pressure will cause the diaphragm portion 10 acting through plunger 10' to urge the lever 23 against the action of spring 25 clockwise until it engages the adjusting screw 52 which is carried by the leaf spring 51. This leaf spring 51 is designed so as to resist the force produced by 5 lbs. pressure on the diaphragm portion 10 and thus acts as a stop for the lever 23, the position of this stop being determined by the adjustment of the cam 30 by its adjusting dial 31. As the lever 23 rotates clockwise the lower end of the bimetallic element 24 will be shifted rearwardly which action will cause rocking of the lever 33 about pivot 34 in the cockwise direction which will permit the valve lever 40 to be urged counter-clockwise by spring 45 for opening the vent valve, this reducing the pressure applied to the pneumatic motor being controlled to zero. Thus at such time a maximum amount of heating medium will be supplied to the room for causing its temperature to rise to the day setting. As the room temperature rises, the lower end of the bimetallic element 24 will swing forwardly and when the room temperature rises to the new setting of the thermostat it will again modulate the pressure in its branch line in the manner described in detail above.

During the cooling season, cooling medium is supplied to the room instead of heating medium and at this time the changeover valve 61 and three-way valve 67 are positioned for placing the master thermostat 70 in control of the pressure applied to the control line 60. When this changeover is made, the pressure applied to the diaphragm portion 10 will be suddenly raised from 5 lbs. to 10 lbs. due to the thermostat 70 being adjusted so as to maintain a minimum of 10 lbs. pressure in its control line. This increase in pressure from 5 lbs. to 10 lbs. applied to the diaphragm portion 10 will cause it to overcome the spring 51 thus causing the lever 23 to be rotated until it engages the adjusting screw 57 which acts as a stop. This adjusting screw is adjusted so as to permit considerable movement of the lever 23 and the bimetallic element 24, the lower end of this bimetallic element swinging rearwardly. This action causes the abutment screw 42 to disengage lever 33 by a wide margin and causes the abutment screw 41 to now engage this lever. It will be noted that the abutment screw 42 abuts the lever 33 on the opposite side of pivots 34 and 39 from the abutment screw 41. This will cause movement of the bimetallic element 24 to actuate the lever 33 in the reverse manner. For example assuming now that the space temperature increases, the lower end of element 24 will swing forwardly which will permit lever 33 to rock clockwise about pivot 34 by spring 45 which at the same time rocks valve lever 40 for opening vent valve 16. This will reduce the pressure applied to the pneumatic motor being controlled, which will cause this motor to increase the supply of cooling medium to the room. As the pressure applied to the motor decreases, the spring 36 forces the diaphragm portion 11 to the left which permits lever 33 to rock clockwise about its point of engagement with abutment screw 41 which causes the valve lever 40 to be returned to its neutral position when the pressure corresponds to the new position of bimetallic element 24. Conversely upon a decrease in temperature in the room the lower end of bimetallic element 24 swings rearwardly thus causing counter-clockwise rotation of lever 33 about pivot 34 which rocks valve lever 40 clockwise against the action of spring 45 for opening the supply valve and increasing the pressure applied to the pneumatic motor which will decrease the supply of cooling medium to the room.

The adjusting screw 57 may be adjusted so that when it is engaged by the lever 23 the position of the bimetallic element 24 is such that it will maintain a desired temperature such as 75° F. As the outside temperature increases above 75° F. the master thermostat 70 will increase the pressure applied to the control line 60 which will cause the diaphragm portion 10 to urge lever 23 clockwise, this action now being resisted by the spring 55 and also by springs 25 and 51. Thus the bimetallic element 24 will be positioned at a point wherein the combined force of springs 25, 51 and 55 just balances the pressure applied to diaphragm portion 10. This clockwise rotation of the bimetallic element 24, as explained previously, will raise the control point of the thermostat. It will thus be apparent that when the instrument is on its summer setting its control point will be graduatingly raised and lowered with outside temperature thereby causing the instrument to maintain whatever temperature is necessary in the room for maintaining it comfortable to the occupants.

During the cooling season it may be desirable to permit the temperature to rise to a maximum during periods of non-occupancy. This result is achieved by positioning the three-way valve 67 so as to connect the air supply line 64 directly to the control line 60 thereby applying maximum pressure to the diaphragm chamber 2 which will adjust the instrument to its highest control point.

The lower end of the bimetallic element 24 is preferably slotted for receiving abutment screws 41 and 42. This provides for adjusting the positions of these abutment screws with relation to the pivots 34 and 39. This provides for varying the ratio of movement between the bimetallic element 24 and lever 33 and thus provides for adjusting the operating differential of the instrument. As the abutment screw 42 is effective only when the thermostat is adjusted for winter or direct action and as the abutment screw 41 is only effective when the thermostat is adjusted for summer or reverse action this arrangement provides for independent differential adjustments of the thermostat when it controls direct acting or reverse acting.

Referring now to Figure 2 this figure shows a modified arrangement for securing the reversal of action of the instrument and also shows the application of the reversing mechanism to a thermostat of the bleed or flapper valve type. In this figure the base member 75 is provided with a bracket 76 carrying the lever 77 which in turn carries the U-shaped bimetallic element 78, a spring 79 being provided for urging the lever 77 against the night adjusting cam 80. The bimetallic element 78 is bent at its lower end to provide an inclined portion 81 to which is secured a spring member 82 the position of which is adjusted by a screw 83. This member 82 engages an abutment member 84 which in turn engages a flapper valve lever 85 carrying a valve member 86 cooperating with a bleed port 87. This bleed port 87 may communicate with a relay 88 of a type well known in the art, this relay being provided with an air supply connection and with a connection to the pneumatic motor being controlled. The abutment member 84 is carried by a link 90 pivoted to the arm 91 of a bell crank type lever which is pivoted to a bracket 92. This lever includes an arm 93 which is adapted for engagement with a stop screw 94 and with a second stop screw 95 carried by a bracket 96. This bell crank lever is actuated by means of a link 97 connected to a flexible operating member 98 which is pivoted at 99 to a bracket 100 which is mounted upon the base plate 75. This operating member 98 is connected to a biasing spring 101 by an adjusting screw 102, and also carries an adjusting screw 103 adapted for engagement with the lever 77 which lever is engaged by the bellows 105 secured to the base member 75 and communicating with the control line corresponding to the control line 60 of Figure 1. The bracket 100 also carries a leaf spring 106 which engages the day adjusting cam 107 and which carries an adjusting screw 108 adapted for engagement with the lever 77.

With the parts in the positions shown, zero pressure is applied to the bellows 105 for causing the instrument to be set at its night setting on winter operation. The lever 77 thus engages the night setting adjusting cam 80. At this time the spring 101 urges the flexible lever 98 counter-clockwise about its pivot 99 which causes the bell crank lever to be positioned for causing its arm 93 to engage the stop screw 94. This causes the arm 91 to raise the abutment member 84 to the position shown wherein it is located above the pivot of the flapper valve lever 85. The abutment member 84 is preferably formed of magnetized material and the flapper valve lever 85 and member 82 are formed of ferrous metal so as to be attracted thereby. Upon an increase in room temperature, the bimetallic element 78 will swing forwardly thereby causing the abutment member 84 to move in the same direction for causing the valve member 86 to approach the bleed port 87 which will increase the pressure applied to the pneumatic motor being controlled. Upon decrease in room temperature the bimetallic element will swing rearwardly which will cause the abutment member 84 to rotate lever 85 counter-clockwise thus causing the valve member 86 to recede from bleed port 87 thereby decreasing the pressure applied to the motor being controlled and increasing the supply of cooling medium to the room.

When 5 lbs. pressure is applied to the bellows 105 for raising the control point of the instrument to its normal day setting, this bellows will expand for causing rotation of lever 77 against the action of spring 79 until it engages the adjusting screw 108 which acts as a stop. The instrument will now maintain a higher room temperature as determined by the adjustment of the cam 107.

When the pressure applied to bellows 105 is raised from 5 lbs. to 10 lbs. this bellows will overcome the spring 106 causing the lever 77 to engage the adjusting screw 103 for thereby rotating the flexible lever 98 clockwise about its pivot 99 which will cause rotation of the bell crank clockwise about its pivot until the arm 93 engages the stop screw 95. This will cause lowering of the abutment member 84 to a point below the pivot of flapper valve lever 85 thereby reversing the action of the instrument. At the same time that the abutment member 84 is being lowered the bimetallic element 78 will be rotated clockwise. This action is compensated for by the inclination of the member 82 which is adjusted so that the control point is not changed while the bell crank is rotating between its stops 94 and 95. The adjusting screw 103 and the biasing spring 101 may be adjusted so that when the thermostat is changed to reverse or summer action, the instrument will maintain a temperature of 75° F. Upon increase in pressure applied to the bellows 105 between 10 lbs. and 15 lbs. the abutment member 84 will remain stationary but the bimetallic element 78 will be rotated for raising the control point of the instrument, this rotation being permitted by flexing of the lever 98. It will be apparent that by adjusting the stops 94 and 95 the positions of the abutment member 84 for direct action and reverse action may be independently adjusted thereby providing for independently adjusting the differential of the instrument for both direct and reverse action.

Referring to Figure 3 this figure discloses the application of the thermostat mechanism of Figure 1 to a thermostat of the flapper valve type. In this figure the thermostat includes a relay 110 of well known form having a bleed port or nozzle 111 cooperating with a flapper valve member 112 carried by a lever 113 which is pivoted at 114 to a bracket 115 mounted to the base member or wall plate of the instrument. The lever 113 is provided with a weight 116 which tends to cause rotation of this lever counter-clockwise, thereby biasing valve member 112 away from bleed port 111. The thermostatic element 24′ which corresponds to the thermostatic element 24 of Figure 1 is provided with a bracket 117 having a face 118 adapted to be engaged by an abutment screw 119 carried by lever 113 at a point above the pivot 114. This lever 113 also carries an abutment screw 120 below pivot 114, this abutment screw being adapted to engage the rear face of thermostatic element 24'. It will be apparent that when the thermostat is on its winter setting, the lever 113 will be positioned by the thermostatic element 24' acting through abutment screw 119. Thus upon a rise in temperature, the element 24' will swing forwardly thus forcing the valve 112 towards port 111 thereby increasing the pressure applied to the controlled pneumatic motor for decreasing the supply of heating medium. When the thermostat is placed on its summer setting, the lower end of element 24' will be shifted rearwardly as in Figure 1, this causing the bracket face 118 to swing clear of abutment member 119 by a large margin and to cause the element 24' to now engage abutment member 120. The action of the instrument will now be reversed. It will be understood that Figure 3 may be provided with the same adjusting mechanism as shown in Figure 1.

While for convenience in illustration only one thermostat is shown as connected to the control line of Figure 1, it will be understood that in actual practice, as many thermostats as necessary for controlling the various rooms or zones of a building may be installed and that these thermostats may be controlled by a single control line.

For purposes of description various specific values of temperature and pressure have been mentioned. It will be understood that these values are illustrative only and may be varied considerably for different applications and adaptations of the invention. Inasmuch as various modifications which are within the scope of this invention will occur to those skilled in the art, it is desired to be limited only by the scope of the appended claims.

I claim as my invention:

1. In a control instrument, in combination, a condition responsive element, a control device, lever means associated with said condition responsive element and said control device, said lever means causing actuation of said control device by said condition responsive element and including means for adjusting the control point of the instrument and for reversing the direction of actuation of said control device by said condition responsive element, and a motor for causing actuation of said lever means for reversing the control action of the instrument and varying the control point of the same, the direction of change in the control point being determined by the direction of movement of said motor.

2. In a pneumatic control instrument, in combination, a condition responsive element, control valve mechanism having a single operating member actuated by said condition responsive element, said control valve mechanism being adapted to change the pressure in a control line in accordance with the condition to which the condition responsive element responds, lever means including reversing means interposed between said condition responsive element and said operating member for reversing the direction of movement of said member by said element, means providing for adjusting the control point of the instrument, and a single pressure motor for actuating said last recited means and said reversing means for thereby reversing the action of the instrument and varying its control point upon change in pressure applied to said pressure motor, the direction of change in the control point being determined by the direction of movement of said motor.

3. In a pneumatic control instrument, in combination, condition responsive means, control valve mechanism having a single operating member actuated by said condition responsive means, said control valve mechanism being adapted to change the pressure in a control line in accordance with the condition to which the condition responsive means responds, reversing means for reversing the direction of actuation of said member by said condition responsive means, means for adjusting the control point of the instrument, and means including a pressure motor for causing operation of said reversing means upon movement of the pressure motor through one portion of its range of movement and for influencing said control point adjusting means in another portion of its range of movement, the direction of change in the control point being determined by the direction of movement of said motor.

4. In a pneumatic control system, in combination, a pneumatic control instrument comprising a condition responsive means, control valve mechanism having a single operating member actuated by said condition responsive means, said control valve mechanism being adapted to change the pressure applied to a pressure responsive device in accordance with the condition to which the condition responsive means responds, reversing means for reversing the direction of pressure change produced by said control valve means with respect to variations in said condition, means for adjusting the control point of the instrument including an air line, pressure motor means responsive to the pressure in said air line, said pressure motor means causing operation of said reversing means upon change in pressure in said air line through a predetermined range and influencing said control point adjusting means upon change in pressure in said air line through a different range, and means for graduatingly varying the pressure in said air line, the direction of change in the control point being determined by the direction of change in pressure in said air line.

5. A pneumatic control instrument comprising condition responsive means, control valve means, connecting means between said condition responsive means and said control valve means, said connecting means including a first lever arranged to actuate said control valve means and a second lever actuated by said condition responsive device, said levers being side by side and said second lever being pivoted at a point intermediate its ends, selective connecting means for connecting said condition responsive means to said second lever on one side or the other of said pivot for providing either direct or reverse action, independently adjustable means for determining the distances from said pivot of said selective connecting means on either side of said first pivot for thereby providing for independent differential adjustments for direct and reverse action of the instrument, and pressure motor means for operating said selective connecting means.

6. In a pneumatic control system, in combination, a pneumatic control instrument comprising condition responsive means, control valve means, connecting means between said condition responsive means and said control valve means, said connecting means including a first lever arranged to actuate said control valve means and a second lever actuated by said condition responsive device, said levers being side by side and said second lever being pivoted at a point intermediate its ends, selective connecting means for connecting said condition responsive means to said second lever on one side or the other of said pivot for providing either direct or reverse action, means for varying the control point of the instrument, an air line, pressure motor means connected to said air line for operating said selective connecting means and said control point varying means for reversing the action of the instrument and changing its control point upon change in pressure in said air line, means for changing the pressure in said air line, and manual adjusting means associated with said instrument for determining the control point of the instrument when operating direct acting and for determining the control point of the instrument when operating reverse acting.

7. In a pneumatic control system, in combination, a pneumatic control instrument comprising condition responsive means, control valve means, connecting means between said condition responsive means and said control valve means, said connecting means including a first lever arranged to actuate said control valve means and a second lever actuated by said condition responsive device, said levers being side by side and said second lever being pivoted at a point intermediate its ends, selective connecting means for connecting said condition responsive means to said second lever on one side or the other of said pivot for providing either direct or reverse action, means for varying the control point of the instrument, an air line, pressure motor means connected to said air line for operating said selective connecting means and said control point varying means for reversing the action of the instrument upon change in pressure in said air line through a predetermined range and for varying the control point upon change in pressure in said air line through a predetermined different range, and means for graduatingly varying the pressure in said air line.

8. In a pneumatic control instrument, a condition responsive element, movable mounting means for said condition responsive element, control valve mechanism, a linkage between said condition responsive element and said control valve mechanism for causing said condition responsive element to actuate said mechanism, said linkage including reversing means operated by movement of the condition responsive element on its movable mounting means, and a pressure motor for shifting the position of said condition responsive element to thereby reverse the action of said condition responsive element on said valve mechanism.

9. In a pneumatic control instrument, in combination, condition responsive means and control valve mechanism actuated thereby, means for reversing the action of the instrument, means for varying the control point of the instrument when the instrument is operating either direct acting or reverse acting, an air line, and means including pressure motor means responsive to the pressure in said air line for actuating said reversing and control point varying means in a manner to vary the control point of said instrument upon change in pressure in said control line through a first range, to reverse the action of the instrument upon change in pressure in the air line through a second range, and to vary the control point of the instrument while acting reversely upon change in pressure in the air through a third range.

JOHN L. HARRIS.